(12) United States Patent
Chitragar et al.

(10) Patent No.: US 10,059,523 B1
(45) Date of Patent: Aug. 28, 2018

(54) MODULAR STANDARD CONFIGURATION BALLPANEL

(71) Applicant: GOODRICH CORPORATION, Charlotte, NC (US)

(72) Inventors: Venkatesh Chitragar, Bangalore (IN); Vikramkumar Bogar, Bangalore (IN); Ravi Murthy, Bangalore (IN); Thirunavukkarasu Ramalingam, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 15/496,371

(22) Filed: Apr. 25, 2017

(30) Foreign Application Priority Data

Feb. 9, 2017 (IN) .............................. 201711004709

(51) Int. Cl.
  *B65G 13/12* (2006.01)
  *B65G 39/02* (2006.01)
  *B64D 9/00* (2006.01)

(52) U.S. Cl.
  CPC ............... *B65G 13/12* (2013.01); *B64D 9/00* (2013.01); *B65G 39/025* (2013.01); *B64D 2009/006* (2013.01); *B65G 2207/34* (2013.01); *B65G 2814/0398* (2013.01)

(58) Field of Classification Search
  CPC .................. B64D 2009/006; B65G 39/025
  USPC ..................................... 193/35 MD
  See application file for complete search history.

(56) References Cited

U.S. PATENT DOCUMENTS

| | | | | |
|---|---|---|---|---|
| 6,125,984 A | * | 10/2000 | Huber | B64C 1/20 193/35 MD |
| 7,073,994 B2 | * | 7/2006 | Huber | B64C 1/20 410/92 |
| 8,157,210 B2 | * | 4/2012 | Huber | B64C 1/061 244/118.1 |
| 8,851,488 B2 | * | 10/2014 | Carruyo | B60P 7/08 280/656 |
| 9,132,907 B2 | * | 9/2015 | Huber | B64C 1/18 |
| 9,643,723 B2 | * | 5/2017 | Himmelmann | B64D 9/00 |
| 2005/0126879 A1 | * | 6/2005 | Olson | B64D 9/00 193/35 MD |
| 2015/0307284 A1 | * | 10/2015 | Stegmiller | B65G 13/00 193/35 MD |
| 2016/0214718 A1 | | 7/2016 | Rajeev | |

* cited by examiner

*Primary Examiner* — James R Bidwell
(74) *Attorney, Agent, or Firm* — Cantor Colburn LLP

(57) ABSTRACT

An aircraft cargo system includes a ball panel assembly having a ball panel and a first enclosure assembly. The ball panel defines a first cutout. The first enclosure assembly is at least partially disposed within the first cutout and is movable between an open position and a closed position. The first enclosure assembly includes a first enclosure defining a first opening that receives a first ball transfer unit.

15 Claims, 3 Drawing Sheets

MODULAR STANDARD CONFIGURATION BALLPANEL

CROSS-REFERENCE TO RELATED APPLICATIONS

This application claims the benefit of Indian Application No. 20171100470 filed Feb. 9, 2017, which is incorporated herein by reference in its entirety.

BACKGROUND

Aircraft include a cargo hold having features that facilitate the loading and unloading of cargo. Various configurations of the features may be provided based on a customer request. Changing between the various configurations may be time consuming and expensive.

BRIEF DESCRIPTION

According to an embodiment of the present disclosure an aircraft cargo system is provided. The aircraft cargo system includes a ball panel assembly having a ball panel and a first enclosure assembly. The ball panel defines a first cutout having a first sidewall, a second sidewall that is disposed opposite the first sidewall, a first end wall extends between the first sidewall and the second sidewall, and a second end wall that is disposed opposite the first end wall and extends between the first sidewall and the second sidewall. The first enclosure assembly is at least partially disposed within the first cutout and is movable between an open position and a closed position. The first enclosure assembly includes a first enclosure defining a first opening that receives a first ball transfer unit.

According to another embodiment of the present disclosure a ball panel assembly for an aircraft cargo system is provided. The ball panel assembly includes a ball panel, a first enclosure assembly, and a second enclosure assembly. The ball panel defines a first cutout and a second cutout spaced apart from the first cutout. The first enclosure assembly has a first ball transfer unit. The first enclosure assembly is pivotally disposed within the first cutout. The second enclosure assembly has a second ball transfer unit. The second enclosure assembly is pivotally disposed within the second cutout.

According to yet another embodiment of the present disclosure a ball panel assembly is provided. The ball panel assembly includes a first enclosure assembly. The first enclosure assembly includes a first enclosure, a first enclosure first ear, and a first enclosure second ear. The first enclosure has a first enclosure first end, a first enclosure second end, a first enclosure first side extends between the first enclosure first end and the first enclosure second end, and a first enclosure second side disposed opposite the first enclosure first side and extends between the first enclosure first end and the first enclosure second end. The first enclosure defines a first opening. The first enclosure first ear extends from the first enclosure first side. The first enclosure second ear extends from the first enclosure second side.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of illustration and not limitation with reference to the Figures.

Figure 1:
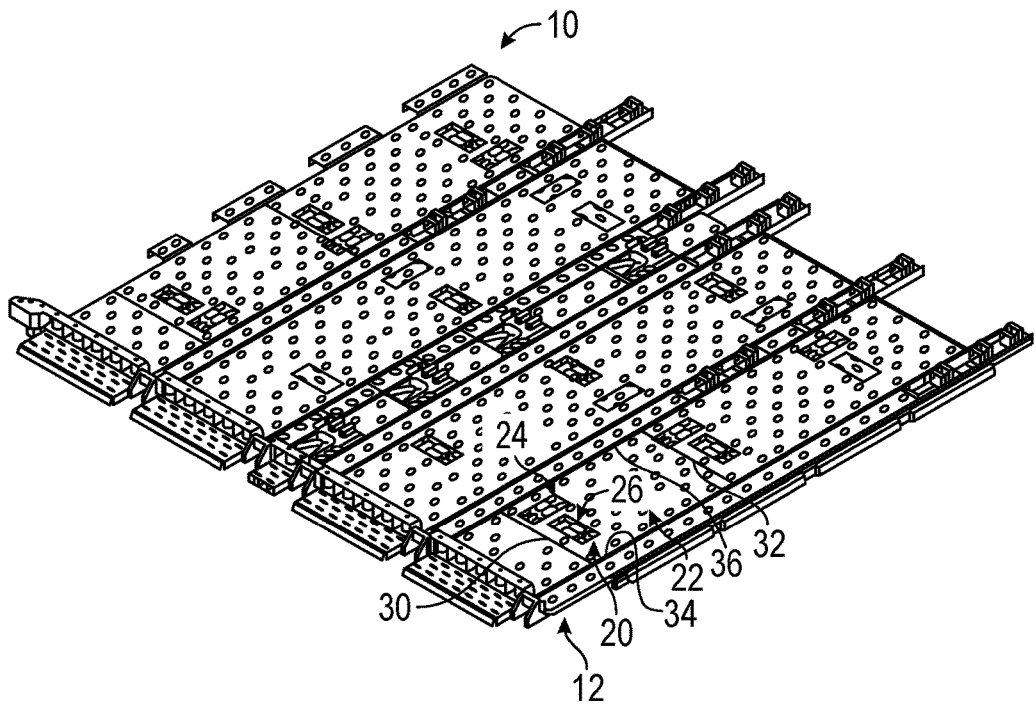
FIG. 1 is a perspective view of a ball panel assembly of an aircraft cargo system.

Referring to FIG. 1, an aircraft cargo hold is provided with an aircraft cargo system 10 that facilitates the loading and unloading of cargo. The aircraft cargo system 10 includes a ball panel assembly 12 having a ball panel 20, a ball transfer unit 22, a first enclosure assembly 24, and a second enclosure assembly 26.

The ball panel 20 includes a first side 30, a second side 32, a third side 34, and a fourth side 36. The second side 32 is disposed opposite the first side 30. The third side 34 extends between the first side 30 and the second side 32. The fourth side 36 is disposed opposite the third side and extends between the first side 30 and the second side 32.

The ball transfer unit 22 may be received within the ball panel 20. In the embodiment shown, a plurality of ball transfer units are received within the ball panel 20. Each ball transfer unit 22 includes a housing that rotatably supports a ball that projects above a top surface of the ball panel 20. A retainer or a cover is at least partially disposed about the ball and provides a smooth transition between the top surface of the ball panel to the ball. The ball of the ball transfer unit 22 provides a low friction support for cargo or the like that may be moved relative to the ball panel 20.

Figure 2:
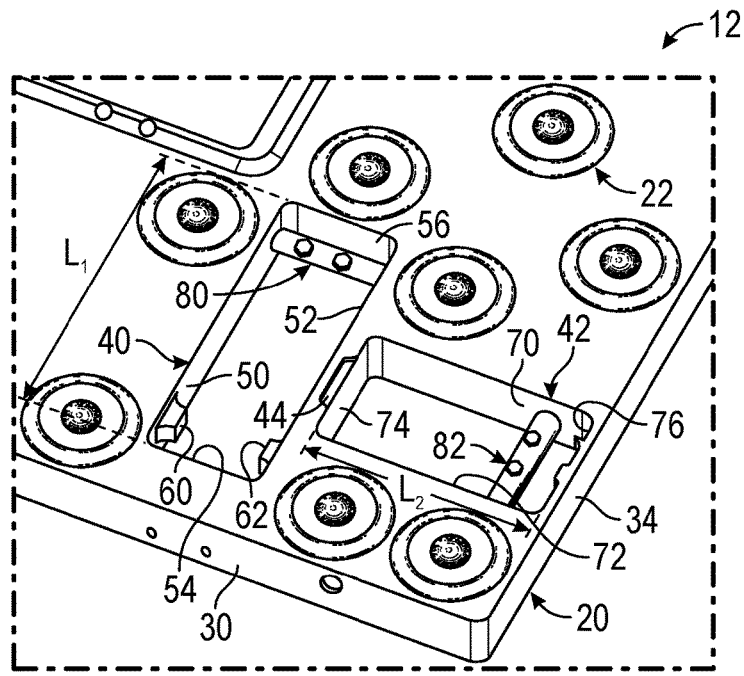
FIG. 2 is a partial perspective view of the ball panel assembly with enclosure assemblies removed.

Referring to FIG. 2, the ball panel 20 defines a first cutout 40, a second cutout 42, and a pocket 44.

The first cutout 40 is at least partially recessed within the ball panel 20. The first cutout 40 includes a first cutout first sidewall 50, a first cutout second sidewall 52, a first cutout first end wall 54, and a first cutout second end wall 56. The first cutout first sidewall 50 extends between the first cutout first end wall 54 and the first cutout second end wall 56. The first cutout second sidewall 52 is disposed opposite the first cutout first sidewall 50 and extends between the first cutout first end wall 54 and the first cutout second end wall 56. The first cutout first end wall 54 is disposed proximate and generally parallel to the first side 30 of the ball panel 20. The first cutout first end wall 54 extends between the first cutout first sidewall 50 and the first cutout second sidewall 52. The first cutout first end wall 54 is disposed opposite the first cutout second end wall 56. The first cutout second end wall 56 extends between the first cutout first sidewall 50 and the first cutout second sidewall 52.

The first cutout 40 has a first length, $L_1$, measured between the first cutout first end wall 54 and the first cutout second end wall 56.

The first cutout first sidewall 50 includes a first tab 60 that extends towards the first cutout second sidewall 52. The first tab 60 is configured as a protrusion, protuberance, a finger, or the like. In at least one embodiment, the first tab 60 may be configured as an elongate member that extends from the first cutout first sidewall 50 to the first cutout second sidewall 52. The first cutout second sidewall 52 includes a second tab 62 that extends towards the first cutout first sidewall 50. The second tab 62 is proximately aligned with and is spaced apart from the first tab 60. The second tab 62 is configured as a protrusion, a protuberance, a finger, or the like.

The second cutout 42 is spaced apart from the first cutout 40. The second cutout 42 is disposed substantially transverse to the first cutout 40. The second cutout 42 is at least partially recessed within the ball panel 20. The second cutout 42 includes a second cutout first sidewall 70, a second cutout second sidewall 72, a second cutout first end wall 74, and a second cutout second end wall 76. The second cutout first sidewall 70 extends between the second cutout first end wall 74 and the second cutout second end wall 76. The second cutout second sidewall 72 is disposed opposite the second cutout first sidewall 70 and extends between the second cutout first end wall 74 and the second cutout second end wall 76. The second cutout first end wall 74 is disposed proximate and generally parallel to the first cutout second sidewall 52. The second cutout first end wall 74 extends between the second cutout first sidewall 70 and the second cutout second sidewall 72. The second cutout first end wall 74 is disposed opposite the second cutout second end wall 76. The second cutout second end wall 76 extends between the second cutout first sidewall 70 and the second cutout second sidewall 72. The second cutout second end wall 76 is disposed proximate and substantially parallel to the third side 34 of the ball panel 20.

The second cutout 42 has a second length, $L_2$, that is measured between the second cutout first end wall 74 and the second cutout second end wall 76. The first length, $L_1$, of the first cutout 40 is greater than the second length, $L_2$, of the second cutout 42.

The pocket 44 is disposed proximate and extends from the second cutout first end wall 74. The pocket 44 is at least partially recessed within the ball panel 20 and has a depth that is less than a depth of the second cutout 42.

The ball panel assembly 12 may have various configurations or layouts to satisfy various sizes of containers or to meet customer requirements. For example, the ball panel assembly 12 may have a first configuration that may permit the use of LD3 and LD8 size containers and may have a second configuration that may permit the use of LD4 size containers.

The ball panel assembly 12 may be switched between the first configuration and the second configuration by installing an enclosure assembly having a ball transfer unit or installing an auxiliary guide/auxiliary lock that may be received within either the first enclosure assembly 24 the second enclosure assembly 26. Either the enclosure assembly having a ball transfer unit or the auxiliary guide/auxiliary lock may be pivotally connected to the first cutout first sidewall 50 and the first cutout second sidewall 52 by a first pin 80. Furthermore, either the enclosure assembly having the ball transfer unit or the auxiliary guide/auxiliary lock may be pivotally connected to the second cutout first sidewall 70 and the second cutout second sidewall 72 by a second pin 82.

The first pin 80 and the second pin 82 may be configured as slider pin assemblies. For example, the first pin 80 may include a first spring-loaded pin that extends into the first cutout first sidewall 50 and a second spring-loaded pin that extends into the first cutout second sidewall 52. The second pin 82 may also include a first spring-loaded pin that extends into the second cutout first sidewall 70 and a second spring-loaded pin that extends into the second cutout second sidewall 72.

Figure 3:
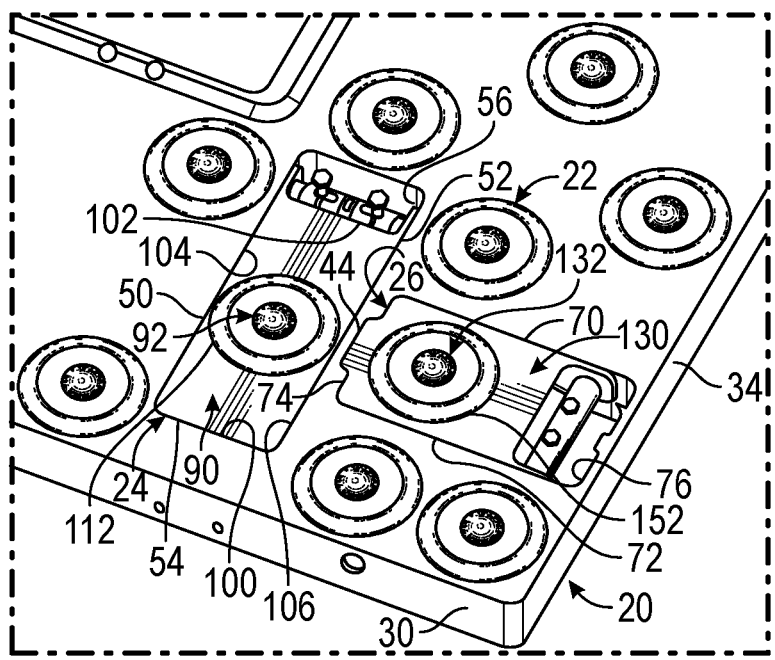
FIG. 3 is a partial perspective view of a ball panel assembly with the enclosure assemblies in a closed position.

Referring to FIG. 3, the first enclosure assembly 24 is at least partially disposed within the first cutout 40 and is pivotally connected to the first cutout first sidewall 50 and the first cutout second sidewall 52 by the first pin 80. The first enclosure assembly 24 is movable between an open position and a closed position.

Figure 4:
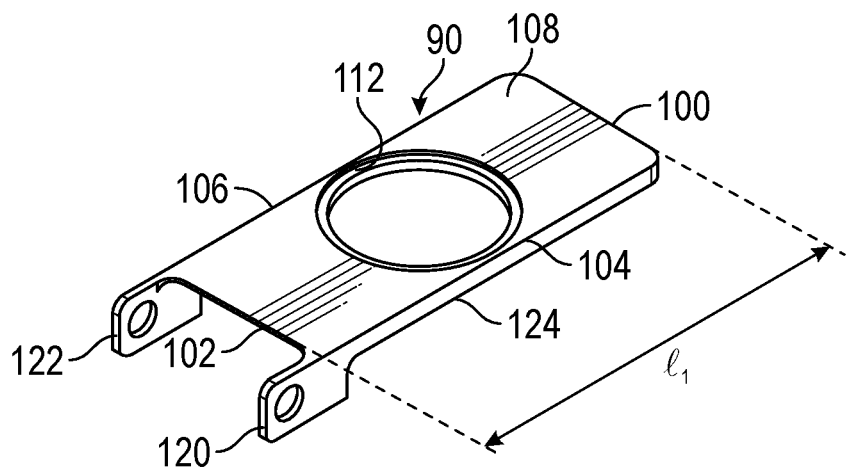
FIG. 4 is a perspective view of a first enclosure.
Figure 5:
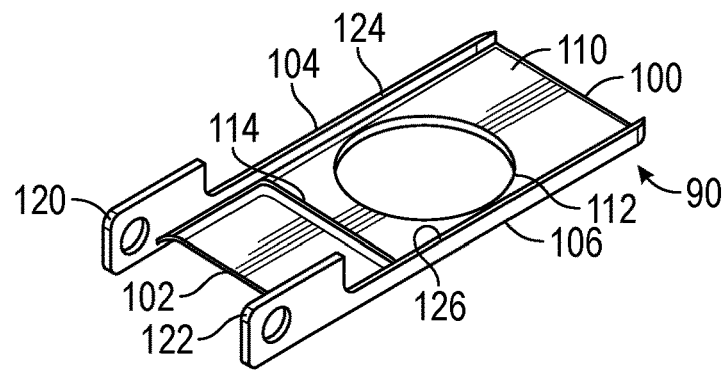
FIG. 5 is a bottom perspective view of the first enclosure.

Referring to FIGS. 3-5, the first enclosure assembly 24 includes a first enclosure 90 and a first ball transfer unit 92.

The first enclosure 90 includes a first enclosure first end 100, a first enclosure second end 102, a first enclosure first side 104, a first enclosure second side 106, a first enclosure first surface 108, a first enclosure second surface 110, and a first enclosure first opening 112.

The first enclosure first end 100 is disposed proximate the first cutout first end wall 54. The first enclosure second end 102 is disposed opposite the first enclosure first end 100 and is disposed proximate the first cutout second end wall 56. The first enclosure first side 104 extends between the first enclosure first end 100 and the first enclosure second end 102. The first enclosure first side 104 is disposed proximate and is disposed substantially parallel to the first cutout first sidewall 50. The first enclosure second side 106 is disposed opposite the first enclosure first side 104 and extends between the first enclosure first end 100 and the first enclosure second end 102. The first enclosure second side 106 is disposed proximate and is disposed substantially parallel to the first cutout second sidewall 52. The first enclosure 90 has a first length, $l_1$, extending between the first enclosure first end 100 and the first enclosure second end 102.

The first enclosure first surface 108 extends between the first enclosure first end 100, the first enclosure second end 102, the first enclosure first side 104, and the first enclosure second side 106. The first enclosure first surface 108 is configured as a top surface of the first enclosure 90. The first enclosure second surface 110 is disposed opposite the first enclosure first surface 108 and extends between the first enclosure first end 100, the first enclosure second end 102, the first enclosure first side 104, and the first enclosure second side 106. The first enclosure second surface 110 engages at least one of the first tab 60 and the second tab 62 while the first enclosure assembly 24 is in the closed position.

As shown in FIG. 5, a groove 114 is formed or defined by the first enclosure second surface 110. The groove 114 is disposed proximate the first enclosure second end 102 and extends between the first enclosure first side 104 and the first enclosure second side 106.

Referring to FIGS. 4 and 5, the first enclosure 90 includes a first enclosure first ear 120 and a first enclosure second ear 122. The first enclosure first ear 120 is disposed generally parallel to the first enclosure first side 104. The first enclosure first ear 120 extends from a first enclosure first skirt 124 that extends from and is disposed substantially perpendicular to the first enclosure first side 104. The first enclosure first ear 120 extends beyond the first enclosure second end 102 and defines an opening that receives a portion of the first pin 80 to pivotally connect the first enclosure 90 to the first cutout first sidewall 50. The first enclosure first skirt 124 engages the first tab 60 while the first enclosure assembly 24 is in the closed position.

The first enclosure second ear 122 is disposed generally parallel to the first enclosure second side 106. The first enclosure second ear 122 extends from a first enclosure second skirt 126 that extends from and is disposed substantially perpendicular to the first enclosure second side 106. The first enclosure second ear 122 extends beyond the first enclosure second end 102 and defines an opening that receives a portion of the first pin 80 to pivotally connect the first enclosure 90 to the first cutout second sidewall 52. The first enclosure second skirt 126 engages the second tab 62 of the first enclosure assembly 24 is in the closed position.

The first enclosure first opening 112 extends from the first enclosure first surface 108 to the first enclosure second surface 110. The first enclosure first opening 112 is sized to receive the first ball transfer unit 92.

The first ball transfer unit 92 includes a housing that rotatably supports a ball that projects above a top surface of the ball panel 20. A retainer or a cover is at least partially disposed about the ball and provides a smooth transition between the top surface of the ball panel to the ball. The ball of the ball transfer unit 22 provides a low friction support for cargo or the like that may be moved relative to the ball panel 20.

Figure 6:
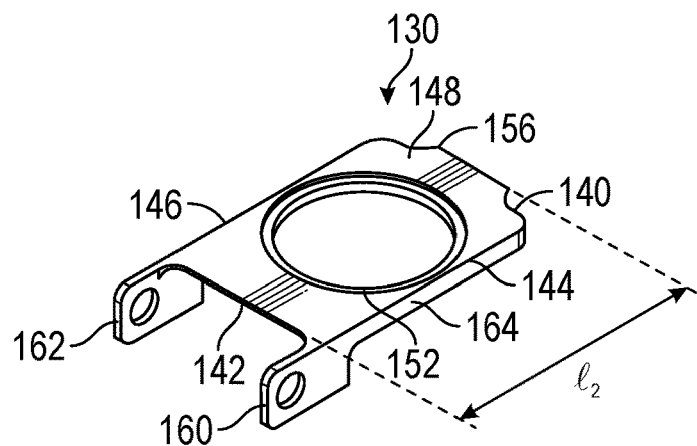
FIG. 6 is a perspective view of a second enclosure.
Figure 7:
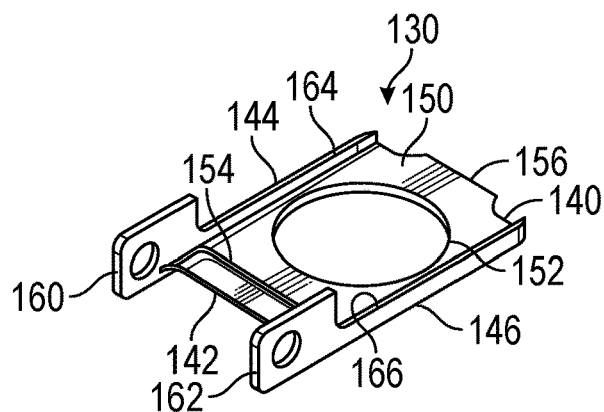
FIG. 7 is a bottom perspective view of the second enclosure.

Referring to FIGS. 3 and 6-7, the second enclosure assembly 26 includes a second enclosure 130 and a second ball transfer unit 132.

The second enclosure 130 includes a second enclosure first end 140, a second enclosure second end 142, a second enclosure first side 144, a second enclosure second side 146, a second enclosure first surface 148, a second enclosure second surface 150, and a second opening 152.

The second enclosure first end 140 is disposed proximate the second cutout first end wall 74. The second enclosure second end 142 is disposed opposite the second enclosure first end 140 and is disposed proximate the second cutout second end wall 76. The second enclosure first side 144 extends between the second enclosure first end 140 and the second enclosure second end 142. The second enclosure first side 144 is disposed proximate and is disposed substantially parallel to the second cutout first sidewall 70. The second enclosure second side 146 is disposed opposite the second enclosure first side 144 and extends between the second enclosure first end 140 and the second enclosure second end 142. The second enclosure second side 146 is disposed proximate and is disposed substantially parallel to the second cutout second sidewall 72.

The second enclosure 130 has a second length, $l_2$, extending between the second enclosure first end 140 and the second enclosure second end 142. The first length, $l_1$, of the first enclosure 90 is greater than the second length, $l_2$, of the second enclosure 130.

The second enclosure first surface 148 extends between the second enclosure first end 140, the second enclosure second end 142, the second enclosure first side 144, and the second enclosure second side 146. The second enclosure first surface 148 is configured as a top surface of the second enclosure 130. The second enclosure second surface 150 is disposed opposite the second enclosure first surface 148 and extends between the second enclosure first end 140, the second enclosure second end 142, the second enclosure first side 144, and the second enclosure second side 146.

As shown in FIG. 7, a groove 154 is formed or defined by the second enclosure second surface 150. The groove 154 is disposed proximate the second enclosure second end 142 and extends between the second enclosure first side 144 and the second enclosure second side 146.

As shown in FIGS. 3 and 6-7, a finger 156 extends from the second enclosure first end 140. The finger 156 is at least partially received within the pocket 44 while the second enclosure assembly 26 is in the closed position.

Referring to FIGS. 6 and 7, the second enclosure 130 includes a second enclosure first ear 160 and a second enclosure second ear 162. The second enclosure first ear 160 is disposed generally parallel to the second enclosure first side 144. The second enclosure first ear 160 extends from a second enclosure first skirt 164 that extends from and is disposed substantially perpendicular to the second enclosure first side 144. The second enclosure first ear 160 extends beyond the second enclosure second end 142 and defines an opening that receives a portion of the second pin 82 to pivotally connect the second enclosure 130 to the second cutout first sidewall 70.

The second enclosure second ear 162 is disposed generally parallel to the second enclosure second side 146. The second enclosure second ear 162 extends from the second enclosure second skirt 166 that extends from and is disposed substantially perpendicular to the second enclosure second side 146. The second enclosure second ear 162 extends beyond the second enclosure second end 142 and defines an opening that receives a portion of the second pin 82 to pivotally connect the second enclosure 130 to the second cutout second sidewall 72.

The second enclosure second opening 152 extends from the second enclosure first surface 148 to the second enclosure second surface 150. The second enclosure second opening 152 is sized to receive the second ball transfer unit 132.

The second ball transfer unit 132 includes a housing that rotatably supports a ball that projects above a top surface of the ball panel 20. A retainer or a cover is at least partially disposed about the ball and provides a smooth transition between the top surface of the ball panel to the ball. The ball of the ball transfer unit 22 provides a low friction support for cargo or the like that may be moved relative to the ball panel 20.

The first enclosure assembly 24 and the second enclosure assembly 26 function as modular ball transfer unit assemblies that fit into the existing ball panel 20 of the ball panel assembly 12 to convert or change the ball panel assembly 12 from the first configuration to the second configuration or vice versa. The first enclosure assembly 24 and the second enclosure assembly 26 provides flexibility for airliners to change over between the first configuration and the second configuration without having to remove the ball panel 20 or the ball panel assembly 12. Furthermore, the first enclosure assembly 24 and the second enclosure assembly 26 enable easy retrofitting of the ball panel assembly 12 and the ball panel 20.

Throughout this specification, the term "attach," "attachment," "connected," "coupled," "coupling," "mount," or "mounting" shall be interpreted to mean that a structural component or element is in some manner connected to or contacts another element, either directly or indirectly through at least one intervening structural element, or is integrally formed with the other structural element.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft cargo system, comprising:
    a ball panel assembly including:
        a ball panel defining a first cutout having a first sidewall, a second sidewall disposed opposite the first sidewall, a first end wall extending between the first sidewall and the second sidewall, and a second end wall disposed opposite the first end wall and extending between the first sidewall and the second sidewall, and
        a first enclosure assembly at least partially disposed within the first cutout and movable between an open position and a closed position, the first enclosure assembly including:
            a first enclosure defining a first opening that receives a first ball transfer unit,
            a first ear and a second ear, each extending from the first enclosure, the first ear is disposed generally parallel to the first sidewall and the second ear is disposed generally parallel to the second sidewall, and
            a first pin that extends through the first ear and into the first sidewall.

2. The aircraft cargo system of claim 1, wherein the first pin extends through the second ear and into the second sidewall.

3. The aircraft cargo system of claim 1, wherein the first sidewall includes a first tab that extends towards the second sidewall.

4. The aircraft cargo system of claim 3, wherein the first enclosure engages the first tab while the first enclosure assembly is in the closed position.

5. A ball panel assembly for an aircraft cargo system, comprising:
    a ball panel defining a first cutout and a second cutout spaced apart from the first cutout, the first cutout has a first cutout first sidewall disposed opposite a first cutout second sidewall and a first cutout first end wall disposed opposite a first cutout second end wall, the first cutout first end wall and the first cutout second end wall each extend between the first cutout first sidewall and the first cutout second sidewall;
    a first enclosure assembly having a first ball transfer unit, the first enclosure assembly being pivotally disposed within the first cutout, the first enclosure assembly has a first enclosure that receives the first ball transfer unit, a first ear extending from the first enclosure and pivotally connected to the first cutout first sidewall, and a second ear extending from the first enclosure and pivotally connected to the first cutout second sidewall; and
    a second enclosure assembly having a second ball transfer unit, the second enclosure assembly being pivotally disposed within the second cutout.

6. The ball panel assembly of claim 5, wherein the first cutout is disposed substantially transverse to the second cutout.

7. The ball panel assembly of claim 5, wherein the second cutout has a second cutout first sidewall disposed opposite a second cutout second sidewall and a second cutout first end wall disposed opposite a second cutout second end wall, the second cutout first end wall and the second cutout second end wall each extend between the second cutout first sidewall and the second cutout second sidewall.

8. The ball panel assembly of claim 7, wherein the ball panel defines a pocket that extends from second cutout first end wall.

9. The ball panel assembly of claim 8, wherein the second enclosure assembly has a second enclosure that receives the second ball transfer unit, a first ear extending from the second enclosure and pivotally connected to the second cutout first sidewall, and a second ear extending from the second enclosure and pivotally connected to the second cutout second sidewall.

10. The ball panel assembly of claim 9, wherein the second enclosure includes a finger that is at least partially received within the pocket.

11. A ball panel assembly, comprising:
    a first enclosure assembly having:
        a first enclosure having a first enclosure first end, a first enclosure second end, a first enclosure first side extending between the first enclosure first end and the first enclosure second end, and a first enclosure second side disposed opposite the first enclosure first side and extending between the first enclosure first end and the first enclosure second end, the first enclosure defining a first opening,
        a first enclosure first ear extending from a first enclosure first skirt that extends from and is disposed substantially perpendicular to the first enclosure first side, and
        a first enclosure second ear extending from a first enclosure second skirt that extends from and is disposed substantially perpendicular to the first enclosure second side.

12. The ball panel assembly of claim 11, wherein the first enclosure first ear and the first enclosure second ear each extend away from the first enclosure second end.

13. The ball panel assembly of claim 11, further comprising:
    a second enclosure assembly having
        a second enclosure having a second enclosure first end, a second enclosure second end, a second enclosure first side extending between the second enclosure first end and the second enclosure second end, and a second enclosure second side disposed opposite the second enclosure first side and extending between the second enclosure first end and the second enclosure second end, the second enclosure defining a second opening,
        a second enclosure first ear extending from the second enclosure first side, and
        a second enclosure second ear extending from the second enclosure second side.

14. The ball panel assembly of claim 13, wherein the second enclosure includes a finger extending from the second enclosure first end.

15. The ball panel assembly of claim 14, wherein the first enclosure has a first length extending between the first enclosure first end and the first enclosure second end and the second enclosure has a second length extending between the second enclosure first end and the second enclosure second end, the first length being greater than the second length.

* * * * *